Figure 1:
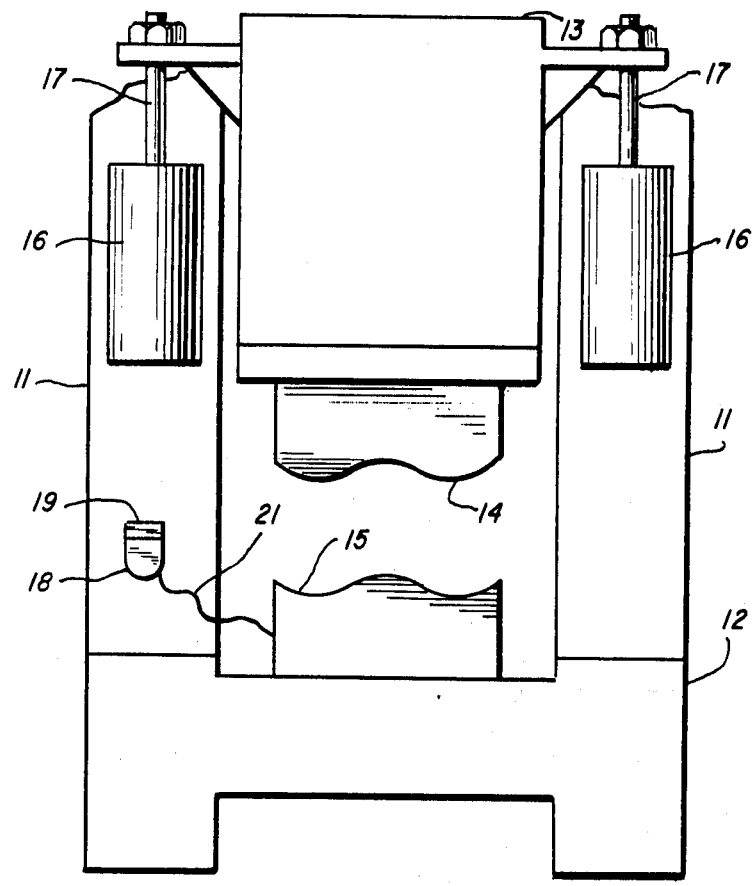

United States Patent [19]

Heiberger

[11] 4,283,929

[45] Aug. 18, 1981

[54] CODED AUTOMATIC COUNTERBALANCE CONTROL

[75] Inventor: Francis E. Heiberger, Elmhurst, Ill.

[73] Assignee: Danly Machine Corporation, Chicago, Ill.

[21] Appl. No.: 57,979

[22] Filed: Jul. 16, 1979

[51] Int. Cl.³ .............................................. B21J 9/20
[52] U.S. Cl. ........................................... 72/7; 72/445; 100/259
[58] Field of Search .......................... 100/48, 99, 259; 267/119; 72/453.18, 445, 7

[56] References Cited

U.S. PATENT DOCUMENTS

| | | | |
|---|---|---|---|
| 3,115,086 | 12/1963 | Stimmel | 100/259 |
| 4,011,809 | 3/1977 | Waller et al. | 100/259 |
| 4,013,002 | 3/1977 | Schneider et al. | 100/259 |
| 4,069,697 | 1/1978 | Morrison et al. | 72/445 |

FOREIGN PATENT DOCUMENTS 2300972  8/1977  Fed. Rep. of Germany .

Primary Examiner—Lowell A. Larson
Attorney, Agent, or Firm—Leydig, Voit, Osann, Mayer & Holt, Ltd.

[57] ABSTRACT

A counterbalance cylinder pressure control for a mechanical press which has a slide, a die punch mounted on the slide and a die shoe. A coded plug is attached to the die shoe and means are provided for reading the code on the plug which indicates the weight of the die punch associated with that die shoe. A voltage signal produced from the decoding of the plug is used in a servo system to control the air pressure in the counterbalance cylinders. When a new die set is placed in the mechanical press, the coded plug attached to the die shoe is read and the servo system operates to reset the counterbalance cylinder pressure to the correct value.

5 Claims, 2 Drawing Figures

U.S. Patent
Aug. 18, 1981
4,283,929

CODED AUTOMATIC COUNTERBALANCE CONTROL

DESCRIPTION OF THE INVENTION

This invention relates generally to mechanical presses and more particularly concerns an automatic counterbalance control for such presses.

A mechanical press serves to provide the force for reshaping materials, usually metals. A die set is placed in the press in order to supply a mold for the material which is being reshaped. The mechanical press includes a frame and a slide, generally mounted for vertical movement within the frame. The die set includes a die shoe mounted in the frame base and a die punch attached to the slide. The press drive imparts vertical movement to the slide and the die punch.

Counterbalances are provided in mechanical presses to counterbalance the moving weight of the press slide, the die punch attached to the slide and any other components attached to the slide. A properly counterbalanced press will stop more quickly than an improperly counterbalanced press and with less loading on the press brake. In a properly counterbalanced press, the gears and bearings of the press will have a longer life and slide adjustments are facilitated since the weight of the slide and die punch are supported by the counterbalance force.

Most mechanical press counterbalances employ pneumatic cylinders, usually a pair of cylinders. The cylinders are used in conjunction with a large surge tank to prevent pressure build up during the press stroke. An air pressure regulator for the counterbalance cylinder pressure is typically provided so that the counterbalance pressure may be adjusted for different die punch weights. Obviously, in order to obtain proper counterbalance, when a die set is changed and a new die punch of a different weight is attached to the slide of the press, a new counterbalance force is required. Typically, for a given mechanical press, proper counterbalance cylinder air pressure settings are provided on a plate affixed to the press frame for various weights of dies. Another means for determining the proper counterbalance force is the observation of the press drive motor current and the setting of counterbalance cylinder pressure at the point where the lowest current is drawn when the press is idling. This method is not possible in some cases such as for two die machines.

In cases where a pressure setting is interpolated from a listing of counterbalance pressures for different dies, it is apparent that the counterbalance cylinder pressure setting will not be exact. In the case of observing press drive motor current or similar approaches, there is the likelihood of subjective errors. Another problem with such manual counterbalance pressure setting techniques is that the pressure may not actually be reset by the press operator after the change of a die set in the press. And, as indicated above, the operation of the press without proper counterbalance will result in additional wear on bearings and gears and otherwise adversely affect the press. It is therefore an object of the present invention to provide an automatic counterbalance control which eliminates the need for settings or adjustments by the press operator.

It is a further object of the invention to provide such a counterbalance control in which the press may be rendered inoperative until proper counterbalance has been obtained.

Figure 2:
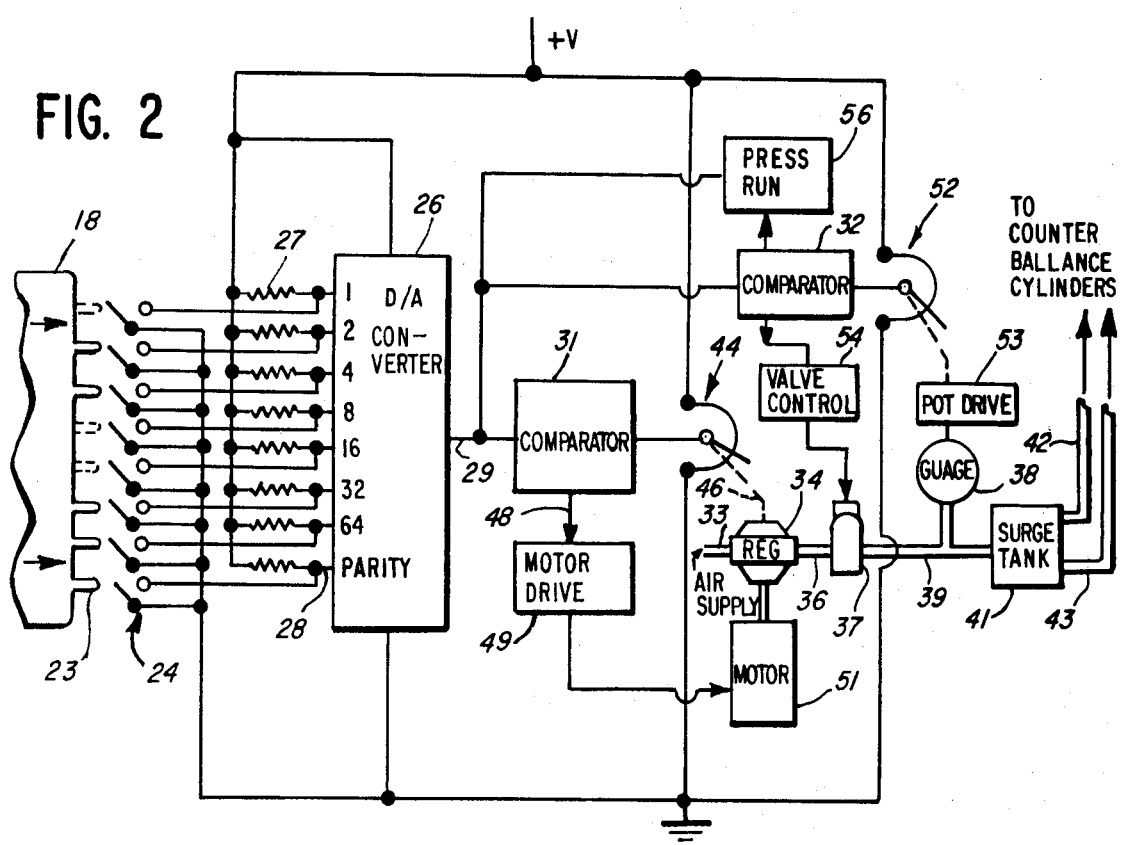

Other objects and advantages of the invention will become apparent upon reading the following detailed description and upon reference to the drawings, in which:

FIG. 1 is a diagrammatic showing of certain of the principle elements of a mechanical press; and FIG. 2 illustrates a counterbalance control system according to the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention, as defined by the appended claims.

Referring now to FIG. 1, a mechanical press is illustrated in simplified diagrammatic form with the crown portion removed. The press includes a frame having a pair of uprights 11 and a bed 12. A slide 13 is mounted in the frame for vertical movement powered by a motor drive (not shown).

A die set consisting of a die punch 14 and a die shoe 15 are mounted in the press for reshaping the metal or other material being operated upon. The die set is removable from the press and may be replaced by other die sets depending upon the material shaping operation to be performed by the press. For the die set in use, the die punch 14 is attached to the slide 13, and the die shoe 15 is mounted on the press bed 12. In operation, the slide 13 and the die punch 14 are driven downwardly bringing the die punch 14 into proximity with the die shoe 15, shaping material disposed therebetween.

In order to counterbalance the weight of the slide 13 and the die punch 14, a pair of pneumatic counterbalance cylinders 16 are mounted on the uprights 11 of the frame. Each cylinder 16 has an associated rod 17 driven by a piston in the cylinder 16 and attached to a laterally extending flange of the slide 13. The pressure in each cylinder 16 provides counterbalance force which acts through each rod 17 to counterbalance the weight of the slide 13 and the die punch 14. As previously discussed, the counterbalance cylinder pressure must be adjusted to provide the proper counterbalance force for the weight of the slide 13 and the die punch 14 mounted on the slide. In the illustrated two cylinder system, equal forces are produced by each cylinder 16.

In accordance with the invention, a coded plug 18 is attached to the die shoe 15 of each die set and bears an indicium of the weight of the die punch 14 for that die set. The plug 18 is attached to the die shoe 15 by a chain 21. A receptacle 19 is conveniently located in an upright 11 of the press frame, and once the die set has been mounted in the press, the plug 18 is inserted into the receptacle 19 to provide automatic counterbalance control as shall be described hereinafter.

In order to decode the indicium on the plug 18 and to control the counterbalance cylinder air pressure, an electropneumatic counterbalance control system is provided as shown in FIG. 2. In the illustrated system the plug 18 has several pins configured according to a binary code which is converted by a digital-to-analog converter to an analog signal which is used to control the air pressure in the counterbalance cylinders 16.

In the illustrated embodiment, to produce a binary digital indication of the weight of the die punch 14 associated with the die shoe 15 to which the plug is attached, the plug 18 includes a plurality of pins 23 which are inserted into the receptacle 19 and are operable to engage a plurality of switches 24. Pin locations where pins have been omitted for the exemplary illustrated plug 18, wherein the blank pin locations are illustrated by outlines of pins in dotted lines, form a binary representation of the weight of the die punch 14 which may be expressed, for example, in tons.

When the plug 18 is inserted into the receptacle 19, the pins 23 on the plug 18 will close the corresponding switches 24. Each switch 24 which is closed will place an input to the digital-to-analog converter circuit 26 at a logic low. Normally these converter inputs are maintained at a logic high by the positive voltage supply V through pull up resistors 27. When the plug 18 is inserted into the receptacle 19, the switches associated with blank pin locations are not closed, and the associated digital-to-analog converter inputs remain at a logic high.

The pin configuration shown in FIG. 2 produces a binary representation of a die punch weight of 25 tons (1+8+16). Obviously, a different scale of units could be used for the digital inputs to the digital-to-analog converter circuit 26; or, alternatively, a different number of inputs or a different digital code could be employed. In the illustrated embodiment, there is a parity input 28 to the D/A converter circuit 26 to establish odd parity for the digital input code. If an even number of blank pin locations were provided on the plug 18, in the illustrated upper seven pin positions, then the bottom pin position would be blank to maintain the odd parity. The parity of the input digital signal may be checked by conventional means in the digital-to-analog converter circuit 26 to detect if an incorrect digital signal is being received. Conveniently, the use of odd parity permits the detection of whether a plug 18 has, in fact, been inserted in the receptacle 19 since there are an even number of digital input lines which will remain at a logic high if no plug 18 is inserted in the receptacle 19. The result of the parity check by the digital-to-analog converter circuit 26 may be used to control a press run-enable circuit 56 to prevent operation of the press if the plug 18 has not been inserted into the receptacle 19.

Assuming proper parity, the digital-to-analog converter circuit 26 produces an analog voltage signal scaled according to the value of the digital binary coded input signal. This analog voltage is placed on an output line 29 and coupled to each of two comparator circuits 31 and 32. These comparator circuits compare the analog signal on the output line 29 with signals representative of the air pressure in the counterbalance cylinder 16 pneumatic lines in order to control the setting of the counterbalance cylinder pressure at the correct level to counterbalance the die punch 14 and the slide 13.

The first comparator circuit 31 receives the analog die punch weight signal as a first comparison signal and internally augments this signal in accordance with the weight of the slide 13 and other fixed components mounted on the slide, which remain the same despite die punch changes. The comparator circuit 32 in a similar fashion receives and augments the analog die punch weight signal from line 29.

The second comparison signals for each of the two comparator circuits 31 and 32 are obtained from potentiometers coupled to elements of the air supply system.

In the air supply system, compressed air from a compressed air supply is coupled to an inlet line 33 and through a motor driven regulator valve 34. The pressure on the output line 36 of the regulator 34 is set by the regulator up to an upper limit of the pressure on the air supply line 33. A bleed off valve 37 is provided on the output side of the regulator 34 and is operable to release excess pressure from the line. A gauge 38 for measuring air pressure is coupled to the compressed air line 39 connecting the valve 37 with a surge tank 41. The surge tank 41 is provided to prevent pressure build-ups in the counterbalance cylinders 16 during the operating stroke of the slide 13 and the die punch 14. The surge tank 41 is typically of a volume five or six times the volume of the cylinders 16. Air lines 42 and 43 couple compressed air between the surge tank and each of the two counterbalance cylinders 16. In the static condition, wherein the rods 17 are stationary, the pressure set at the output side of the regulator 34 through the valve 37 and the surge tank 41 to the counterbalance cylinders 16 is the same.

The comparator circuit 31 compares the slide 13 and die punch 14 weight to the pressure setting of the air pressure regulator 34. The regulator pressure setting is conveniently obtained from a potentiometer 44 having a wiper arm driven by a regulator 34 control shaft shown diagrammatically as 46. Internally performing the necessary conversions from air pressure to tons of force exerted by the counterbalance cylinders, the comparator circuit 31 compares the weight of the slide 13 and die punch 14 with the pressure regulator setting from the potentiometer 44 to produce an error signal on line 48 which is coupled to a motor drive circuit 49. The motor drive 49 activates a bidirectional drive motor 51 to set the pressure regulator 34.

One direction of motion of the motor 51 will drive the regulator to increase the setting of the regulator output pressure on line 36, and the opposite direction of motion of the motor 51 will decrease the setting of the regulator output pressure on line 36. The sign of the voltage on line 48, positive or negative, provides a convenient reference for the motor drive circuit 49 to determine the direction of rotation for the motor 51. The motor will continue to adjust the regulator 34 until a null is detected by the comparator circuit 31 between the setting of the potentiometer 44 and the analog signal 29.

If the die punch 14 which has been mounted on the slide 13 is heavier than the previous die punch, an increase in pressure will be necessary in the counterbalance cylinders. In this case, increasing pressure at the output of the regulator 34 will provide the necessary pressure adjustment for the counterbalance cylinders to increase the counterbalance force. However, if the die punch 14 is lighter than the previous die punch mounted on the slide 13, the valve 37 must be opened in order to bleed off the excess pressure in the counterbalance cylinders. Consequently, the cylinder pressure must be compared with the slide and die punch weight to determine if there is excess pressure in the cylinders.

In order to do this, the second comparator 32 compares the analog signal on the line 29 with the setting of a potentiometer 52. This potentiometer is driven by a transducer or drive unit 53 coupled to the gauge 38 measuring the air pressure in the counterbalance cylinder system. Therefore, the second comparator 32 is comparing the force produced by the actual counterbalance cylinder pressure with the slide and die punch weight to be counterbalanced. As indicated previously, if an increase in pressure in the counterbalance cylinder pressure system is necessary, the operation of the regulator 34 will provide the increased pressure. If the required counterbalance cylinder pressure is lower than the previous pressure, the comparator 32 detects this condition and actuates a valve control circuit 54 to open the valve 37. As the gauge 38 senses the decreasing pressure, the potentiometer 52 tracks the pressure value, and when the comparator 32 detects a null between the pressure value and the force derived from the analog signal on the line 29, the valve control 54 closes the valve 37.

Therefore, whether the new die punch 14 requires greater or lesser counterbalance pressure in the counterbalance cylinders 16, the system of FIG. 2 provides the necessary pressure. Both comparator circuits 31 and 32 achieve a null condition at the proper counterbalance cylinder pressure level, whether the regulator 34 or the valve 37 have been operated to obtain that pressure level.

A null in the comparator circuit 32, indicating that the proper counterbalance pressure level has been reached, may also be coupled to a press run-enable circuit 56 to prevent operation of the press until the proper counterbalance pressure has been set.

In operation, then, when a new die set is inserted into the mechanical press, the plug 18 chained to the die shoe 15 is inserted in the receptacle 19 and the pins on the plug are read by the converter circuit 26. The converter circuit 26 produces an analog voltage on line 29 which is compared by the comparator circuit 31 with the pressure regulator setting and compared by the comparator 32 with the actual pressure level in the counterbalance cylinder system. The comparator circuits then use the comparison results to control the regulator 34 and the valve 37 as necessary to set the counterbalance cylinder system pressure at the correct level to counterbalance the weight of the slide 13 and the new die punch 14. When the proper counterbalance cylinder system pressure has been obtained, a press run-enable circuit 56 may be activated to allow operation of the press.

It can be seen therefore that an automatic counterbalance control system for a mechanical press has been provided which eliminates the need for settings and adjustments by an operator of the press. It can be further seen that the control system described may be employed so that the press is rendered inoperative until properly counterbalanced.

While the invention has been described in regard to counterbalance cylinder pressure adjustment, it will be understood that it is also applicable to other types of adjustable counterbalances wherein the counterbalance force is provided by means other than pneumatic cylinders.

What is claimed is:

1. In a mechanical press having a slide, a die set including the elements of a die punch attached to the slide and a die shoe, a counterbalance cylinder pressurized to support the slide and the die punch, and means for adjusting the counterbalance cylinder pressure in response to an electrical signal, the improvement comprising:
    a plug attached to an element of the die set, the plug having a portion bearing a readable digital code indicative of the weight of the die punch in the die set, the readable digital code borne by the plug being of a selected parity, including a parity bit if necessary; and
    means for converting said readable digital code on the plug to an electrical signal dependent upon said code, said electrical signal being utilized by the adjusting means for the counterbalance cylinder.

2. The improvement of claim 1 in which the means for converting comprises a receptacle on the frame of the mechanical press receiving the plug and including means for reading the digital code on the plug to produce an electrical signal dependent thereon.

3. The improvement of claim 1 in which the mechanical press further includes a second counterbalance cylinder and means for adjusting the pressure of said second counterbalance cylinder in response to said electrical signal.

4. The improvement of claim 1 in which the means for converting includes a digital-to-analog converter for producing an analog electrical signal.

5. The improvement of claim 4 in which the means for converting includes means for preventing operation of the mechanical press when an indicium on the plug is not being detected.

* * * * *